United States Patent
Zhu et al.

(10) Patent No.: US 11,481,364 B2
(45) Date of Patent: Oct. 25, 2022

(54) ROW-COLUMN FORMATTING FOR RELATIONAL DATABASES

(71) Applicant: ALIBABA GROUP HOLDING LIMITED, Grand Cayman (KY)

(72) Inventors: Cheng Zhu, San Mateo, CA (US); Fang Zheng, San Mateo, CA (US); Congnan Luo, San Mateo, CA (US); Xiaowei Zhu, San Mateo, CA (US); Huaizhi Li, San Mateo, CA (US); Ruiping Li, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 51 days.

(21) Appl. No.: 16/715,931

(22) Filed: Dec. 16, 2019

(65) Prior Publication Data

US 2021/0182250 A1    Jun. 17, 2021

(51) Int. Cl.
| | |
|---|---|
| *G06F 16/21* | (2019.01) |
| *G06F 16/22* | (2019.01) |
| *G06F 16/23* | (2019.01) |
| *G06F 16/28* | (2019.01) |

(52) U.S. Cl.
CPC ........ *G06F 16/211* (2019.01); *G06F 16/2282* (2019.01); *G06F 16/23* (2019.01); *G06F 16/284* (2019.01)

(58) Field of Classification Search
CPC ...... G06F 16/211; G06F 16/284; G06F 16/23; G06F 16/2282

USPC .......................................................... 707/696
See application file for complete search history.

(56) References Cited

U.S. PATENT DOCUMENTS

| | | | |
|---|---|---|---|
| 2005/0165741 A1* | 7/2005 | Gordon | G06F 16/24542 |
| 2013/0185251 A1* | 7/2013 | Garg | G06F 16/86 |
| | | | 707/602 |
| 2014/0095472 A1* | 4/2014 | Lee | G06F 16/24542 |
| | | | 707/714 |
| 2015/0186448 A1* | 7/2015 | Delafranier | G06F 16/219 |
| | | | 707/703 |
| 2016/0210064 A1* | 7/2016 | Dornemann | G06F 16/275 |
| 2018/0107699 A1* | 4/2018 | Nakadai | G06F 16/00 |
| 2021/0034589 A1* | 2/2021 | Mathur | G06F 16/2358 |

OTHER PUBLICATIONS

OraUtil: "Oracle® Database Utilities 11g Release 2 (11.2)", Primary Author: Kathy Rich, Apr. 2018, (Part No. E22490-08, Oracle® Corporation, 2018, hereafter "OraUtil"). (Year: 2018).*
Wikipedia—Greenplum (5 pgs.). https://en.wikipedia.org/wiki/Greenplum.

(Continued)

*Primary Examiner* — Kuen S Lu
(74) *Attorney, Agent, or Firm* — Finnegan, Henderson, Farabow, Garrett & Dunner, LLP

(57) ABSTRACT

Embodiments of the present disclosure provide methods and devices for formatting a database. The method can include clustering, into each block, a set of sequence of elements from each column of a database; generating a file storing one or more blocks having the clustered set of sequences of elements; providing a first table storing file schema information that associates the elements with the file; and providing a second table for storing block schema information that associates the columns with the one or more blocks.

21 Claims, 8 Drawing Sheets

(56) References Cited

OTHER PUBLICATIONS

Building Greenplum Database with GPORCA Article (12 pgs.). https://github.com/greenblum-db/gpdb.
Cstore_fdw Article (11 pgs.). https://github.com/citusdata/cstore_fdw.

* cited by examiner (A)

| ID | LastName | FirstName | Salary |
|---|---|---|---|
| 100 | Smith | Joe | 20000 |
| 101 | Jones | Cathy | 50000 |
| 102 | Johnson | Mary | 90000 |
| 103 | Hank | Tom | 33000 |
| 104 | Levis | Jerry | 44000 |
| 105 | Rivers | Andy | 66000 |

(B)

| ID | LastName | FirstName | Salary |
|---|---|---|---|
| 100 | Smith | Joe | 20000 |
| 101 | Jones | Cathy | 50000 |
| 102 | Johnson | Mary | 90000 |
| 103 | Hank | Tom | 33000 |
| 104 | Levis | Jerry | 44000 |
| 105 | Rivers | Andy | 66000 |

FIG. 1

ROW-COLUMN FORMATTING FOR RELATIONAL DATABASES

BACKGROUND

In a relational database, data is represented as a two-dimensional table of rows and columns. In current solutions, the data can be stored in row-oriented and column-oriented formats.

A row-oriented Database Management System (DBMS) stores data tables by row. Row-oriented systems are designed to efficiently return data for an entire row, or record, in as few operations as possible. This matches the common use-case where the system is attempting to retrieve information about a particular object or product information for an online shopping system. By storing the record's data in a single block on the disk, along with related records, the system can quickly retrieve records with a minimum of disk I/O operations. However, in Online Analytical Processing (OLAP) queries, not each value of a row is of same significance. Row-oriented systems are not efficient at performing queries when only a few columns of a row are desired for queries.

A columnar or column-oriented DBMS stores data tables by column. The values of one column in a table are stored in one column file. This is designed to efficiently support OLAP queries where often only a few columns instead of an entire row are of interest in a table. In a columnar format, data of a particular column or a few columns can be retrieved without performing I/O operations on the columns that are not queried. In addition, compression on the values of one column can be more effective as they are of the same type, which has been proven to be a considerable saving on I/O cost for many typical OLAP queries. By storing data in columns rather than rows, the database can more precisely access the data it needs to answer a query rather than scanning and discarding unwanted data in rows. Query performance is improved for certain workloads. However, as values of all the columns of a single row spread across different column files, accessing a row requires accessing all corresponding column files. Since many typical Online Transactional Processing (OLTP) queries often request such operations, I/O costs are inevitably increased in columnar systems.

Both columnar and row databases can use traditional database query languages like SQL to load data and perform queries, and can become the backbone in a system to serve data for common extract, transform, load and data visualization tools. In current solutions, a relational database can be stored in a row-oriented format in one copy and in a column-oriented format in another copy such that a system can benefit from both formats, however, at the cost of consumption of resources.

SUMMARY

Embodiments of the present disclosure provide methods and devices for formatting a relational database. The method can include clustering, into each block, a set of sequence of elements from each column of a relational database, wherein the set of sequence of elements of each column has a same number of elements; generating a file storing one or more blocks having the clustered set of sequences of elements; providing a first table storing file schema information that associates the elements with the file; and providing a second table for storing block schema information that associates the columns with the one or more blocks.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings:

FIG. 1 illustrates exemplary formats of storing data in a database.

DETAILED DESCRIPTION

Figure 2:
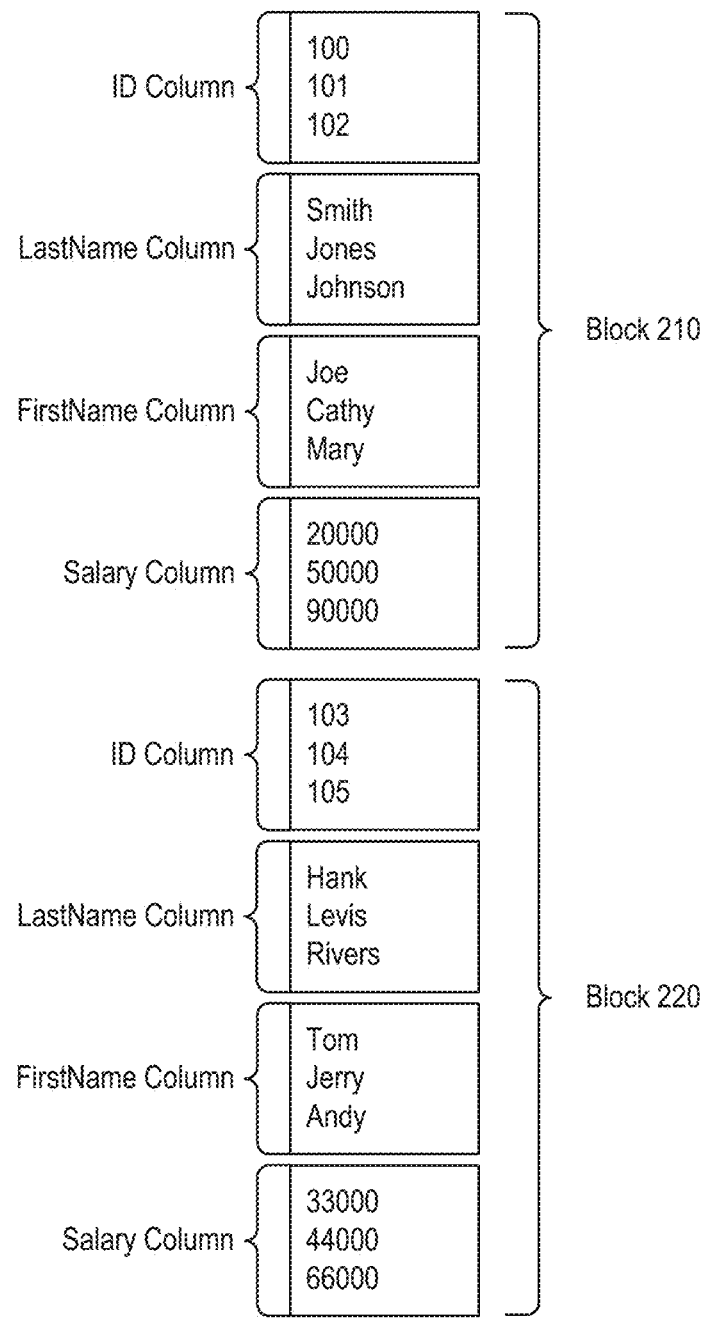
FIG. 2 illustrates an exemplary format of row-column hybrid storage in a database.

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

Current solutions often have drawbacks in an attempt to provide improvements to column-oriented or row-oriented database systems. Some conventional column-oriented databases are more efficient in OLAP, but not for OLTP workloads. For example, a column-oriented database system may store append-only data. The column-oriented database system can use one file for each column. When a data table includes considerable number of columns, reading an entire row of data can result in reading a significant amount of files, which is not desirable in terms of I/O costs. In another example, a column-oriented extension clusters rows into blocks, but saves metadata with data in a table. Requirements of Atomicity, Consistency, Isolation, Durability (ACID) can only be met at file level, which increases difficulty for frequent delete operations and update operations. In a column-oriented format, data of all columns of a single row is stored across a storage disk or multiple storage disks. An OLTP query typically retrieves an entire row of data. When the database is a column-oriented only format, the OLTP query causes accessing physical storage across the storage disk or multiple storage disks. Such inefficiency makes column-oriented format not ideal for OLTP queries. On the other hand, a conventional row-oriented format does not provide efficiency for OLAP queries that only require accessing a certain columns of the data. Scanning the entire database to locate certain columns of data due to the row-oriented format leads to delay during data retrieving. Accordingly, conventional systems using either the row-oriented format or the column-oriented format of a relational database are inefficient.

The disclosed embodiments provide improvements over these conventional systems. For example, in some embodiments, a database system uses a column-row hybrid format to assist with serving various types of queries. In a column-row hybrid format, rows are arranged in multiple blocks. Within a single block, data is stored by columns. When there is an OLAP query, a database system can only retrieve from selected columns because data is stored by columns within the blocks. When there is an OLTP query, the database system can scan and retrieve data from selected blocks to reduce I/O traffic rather than scanning individual column files that typically store data by columns in a column-oriented database.

Moreover, in some embodiments, a database system can format a relational database in a manner for inputting and outputting data more efficiently. For example, the database system can retrieve an entire row with reduced I/O bandwidth consumption in response to OLTP queries and OLAP queries due to the row-column format. It also helps to guarantee ACID when the database system saves metadata separately from the data table. A data scan operation is also provided to perform queries on the database in the exemplary format.

Many of the modern databases are columnar databases, which store data in columns rather than in rows. FIG. 1 illustrates exemplary formats of storing data in a database. As illustrated in FIG. 1(A), data can be logically represented as a two-dimensional table, which comprises columns and rows. The table shown in FIG. 1(A) has four columns and six rows. The columns are named "ID," "LastName," "First-Name," and "Salary." Data shown in the table can be stored in a number of ways. One way is called row-oriented storage. In row-oriented storage, data is stored row by row, and all the columns of a single row are physically placed together, similar to those shown in FIG. 1(A). The row-oriented storage is used for efficient access of data located in the same row. For example, if a user of a database system wishes to retrieve all column information associated with an entry "100" in the "ID" column, the user can easily retrieve entries "Smith," "Joe," and "20000" from the storage since these entries are physically stored together. Row-oriented storage is commonly used for transactional queries, such as OLTP.

Another way to store data is called column-oriented storage. In column-oriented storage, data is stored column by column, and all the rows of a single column are physically placed together. As shown in FIG. 1(B), each column is saved in a separately. For example, all entries in the "ID" column are saved together. Each column is usually further divided into blocks and each block is stored in compressed form. During query processing, data is read back from storage into memory in units of blocks.

The column-oriented storage is used to efficiently support analytical queries that are often interested in a subset of one or more columns. With the column-oriented storage, data of a particular column or a few columns can be retrieved without wasting input/output ("I/O") bandwidth on columns that are not needed. In addition, column-oriented storage can allow for more efficient data compression because data in a column is typically of a same type. Column-orientated storage has demonstrated an ability to provide significant saving on I/O cost for many analytical queries, including OLAP.

In many database systems featuring the column-oriented storage, data of all columns of a single row are spread out across the storage disk or multiple storage disks. For example, a block of data can be stored in a specific location on a disk storage, and other blocks of data may be stored in other locations that are not physically adjacent. As a result, accessing a particular row will require accessing multiple disk blocks spread across the storage disk or multiple storage disks, which can cause significant delay. Unfortunately, many typical OLTP queries often request such operations.

To address this inefficiency, some database systems adopt a row-columnar storage or row-column hybrid storage. It first divides rows into blocks. The column-oriented storage is then used for each block. FIG. 2 illustrates an exemplary format of row-column hybrid storage in a database. On the basis of the data illustrated in FIG. 1, the row-column hybrid storage of FIG. 2 divides up the data into two blocks named block 210 and block 220. Block 210 comprises the first three rows of data, and block 220 comprises the next three rows of data. Data in each block is then stored according to the column-oriented storage.

Depending on the size of the blocks, accessing a particular row in a row-column hybrid storage can request fewer data blocks than the pure column-oriented storage, because the column entries of a row are now located closer to each other. As a result, the row-column hybrid storage can perform well for OLTP queries. At the same time, the row-column hybrid storage still gets a great deal of benefit of the column-oriented storage that is applied to each block, because data inside each block is still stored in a column-oriented storage. Therefore, the row-column hybrid storage is often a good option for a mixed workload of OLTP and OLAP. In the following description, column-oriented storage is used to describe pure column-oriented storage and its row-column variant, and row column storage and row-column hybrid storage are used interchangeably.

Figure 3:
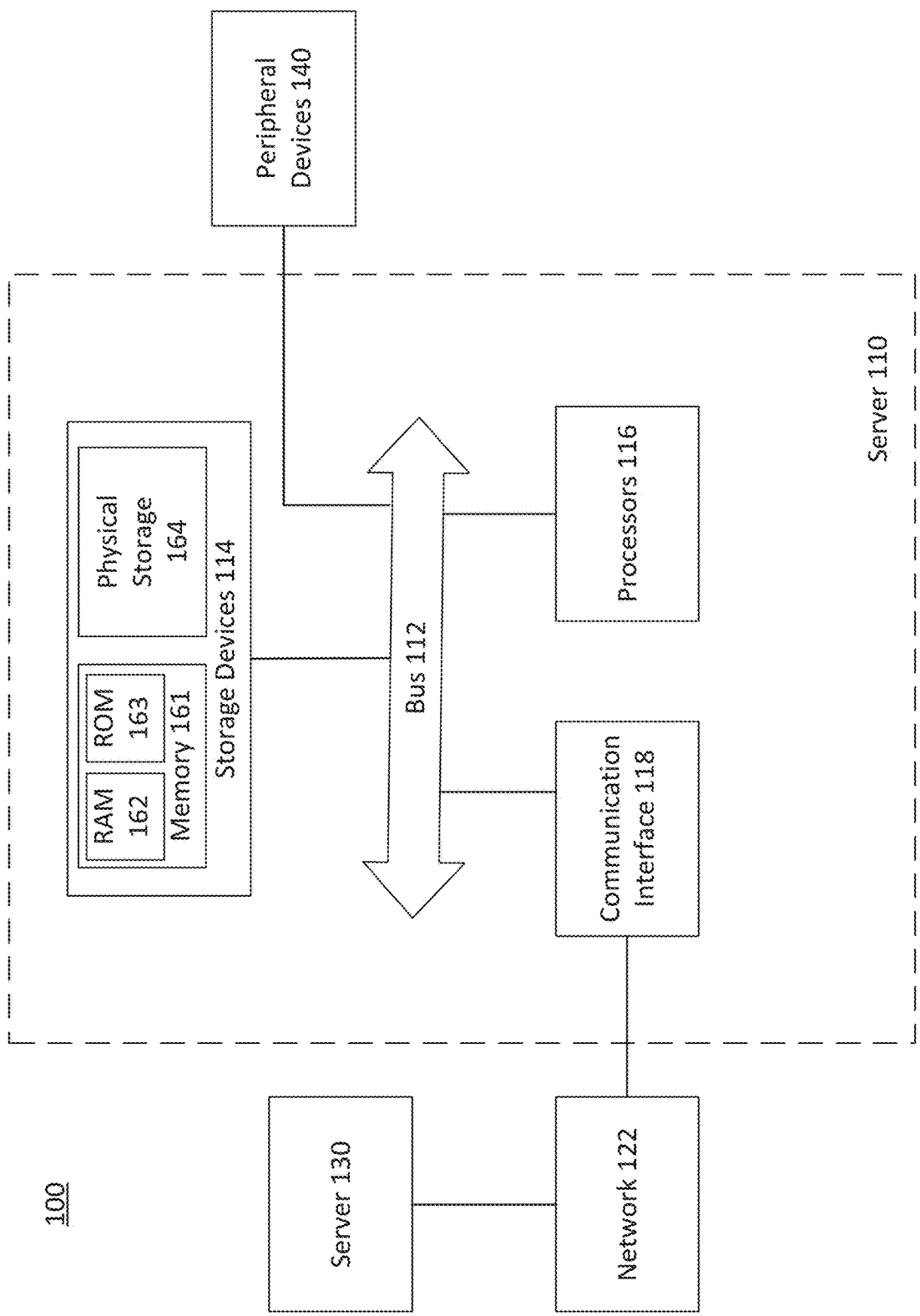
FIG. 3 illustrates a schematic diagram of an exemplary server of a database, consistent with some embodiments of the present disclosure.

FIG. 3 illustrates a schematic diagram of an exemplary server of a database, according to some embodiments of the present disclosure. According to FIG. 3, server 110 of database 100 comprises a bus 112 or other communication mechanism for communicating information, and one or more processors 116 communicatively coupled with bus 112 for processing information. Processors 116 can be, for example, one or more microprocessors. In some embodiments, database 100 can be an OLAP database, an OLTP database, or a hybrid transactional/analytical processing (HTAP) database.

Server 110 can transmit data to or communicate with another server 130 through a network 122. Network 122 can be a local network, an internet service provider, internet, or any combination thereof. Communication interface 118 of server 110 is connected to network 122. In addition, server 110 can be coupled via bus 112 to peripheral devices 140, which comprises displays (e.g., cathode ray tube (CRT), liquid crystal display (LCD), touch screen, etc.) and input devices (e.g., keyboard, mouse, soft keypad, etc.).

Server 110 can be implemented using customized hard-wired logic, one or more ASICs or FPGAs, firmware, or program logic that in combination with the server causes server 110 to be a special-purpose machine.

Server 110 further comprises storage devices 114, which may include memory 161 and physical storage 164 (e.g., hard drive, solid-state drive, etc.). Memory 161 may include random access memory (RAM) 162 and read only memory (ROM) 163. Storage devices 114 can be communicatively coupled with processors 116 via bus 112. Storage devices 114 may include a main memory, which can be used for storing temporary variables or other intermediate information during execution of instructions to be executed by processors 116. Such instructions, after being stored in non-transitory storage media accessible to processors 116, render server 110 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Various forms of media can be involved in carrying one or more sequences of one or more instructions to processors 116 for execution. For example, the instructions can initially be carried out on a magnetic disk or solid-state drive of a remote computer. The remote computer can load the instructions into its dynamic memory and send the instructions over a telephone line using a modem. A modem local to server 110 can receive the data on the telephone line and use an infra-red transmitter to convert the data to an infra-red signal. An infra-red detector can receive the data carried in the infra-red signal and appropriate circuitry can place the data on bus 112. Bus 112 carries the data to the main memory within storage devices 114, from which processors 116 retrieves and executes the instructions.

Figure 4:
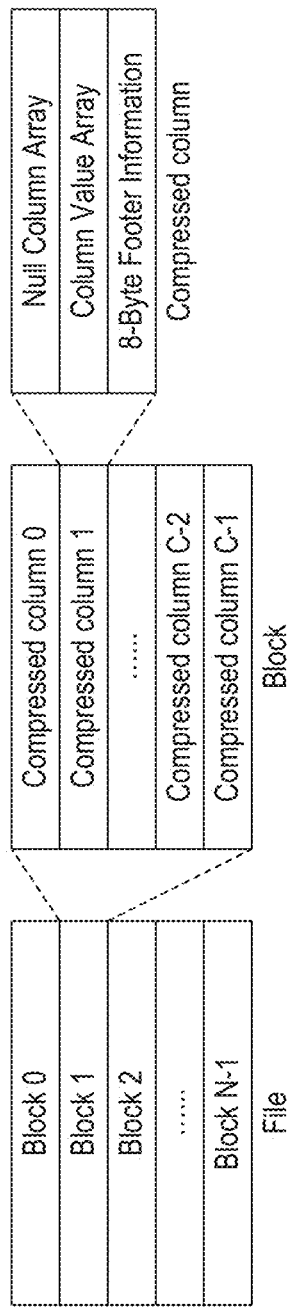
FIG. 4 illustrates a schematic diagram of an exemplary formatted table, consistent with some embodiments of the present disclosure.

FIG. 4 illustrates a schematic diagram of an exemplary formatted table, according to some embodiments of the present disclosure. The relational database is formatted into a file where the data file stores multiple blocks. For example, data file comprises block 0, block 1, block 2, etc. Inside each block, columns are compressed one by one, and the compressed columns are stored in order. For example, block 1 comprises compressed column 0, compressed column 1, compressed column 2, etc., and the compressed columns are stored in their respective order. The metadata for the compressed columns in the data file is stored in a separate table. The blocks can be N-variable-length blocks. Each block can contain different number of rows of the relational database. Each block stores clustered columns in a columnar format. Each column is compressed within one block.

Each compressed column can include metadata such as Null Column Array that indicates which column value is null, and Footer Information that indicates column compression type and checksum, along with Column Value Array that contains values of the column. When the column is compressed, Null Column Array is used to assist clustering data of the same type for better compression rate.

An exemplary database system can provide the file that contains the formatted relational database and can also provide tables that contains metadata associated with the relational database. The metadata that describes schemas of the relational database are stored separately in a block description table and a file information table. Both tables can support Atomicity, Consistency, Isolation, Durability (ACID). ACID is a set of properties of database transactions to guarantee validity of data at any point of time. In databases, a transaction can consist of a sequence of operations that satisfies the ACID requirement. These operations are bounded together and can be perceived as a single logical operation on the data. Atomicity indicates that the operations perceived as one signal logical operation are non-done or all-done. Consistency demands that the data must meet all validation rules. The consistency can be checked after each transaction. A validity check that reveals inconsistency with the rules can lead to cancellation of the transaction and rollback of affected rows of a database. Transactions are often executed concurrently, e.g. multiple transactions reading and writing to a table at the same time. Isolation ensures that concurrent execution of transactions leaves the database in the same state that would have been obtained if the transactions were executed sequentially. Durability indicates all modifications of a committed transaction are not lost in cases of system disaster, like power down or crash. The support of ACID of both tables enables that transactions on data of the relational database is performed at a block level, even though the data is stored separately from the metadata.

In some embodiments, database systems can implement metadata structures to accompany data that is stored in blocks. Metadata of a data block in a row-column hybrid storage can contain important information for the data block, such as the location of the data stored in the data block in the original file. The metadata of a data block can also contain statistical information about each column in the block, such as minimum and maximum values of each column in the block. If data is compressed when the data is stored into storage, metadata can also comprise information on the compression process, such as the method of compression. In some embodiments, metadata is collected or determined when the data is written into storage. In some embodiments, metadata is stored separately from the data files. For example, the metadata can be stored in auxiliary tables in the database system.

Figure 5:
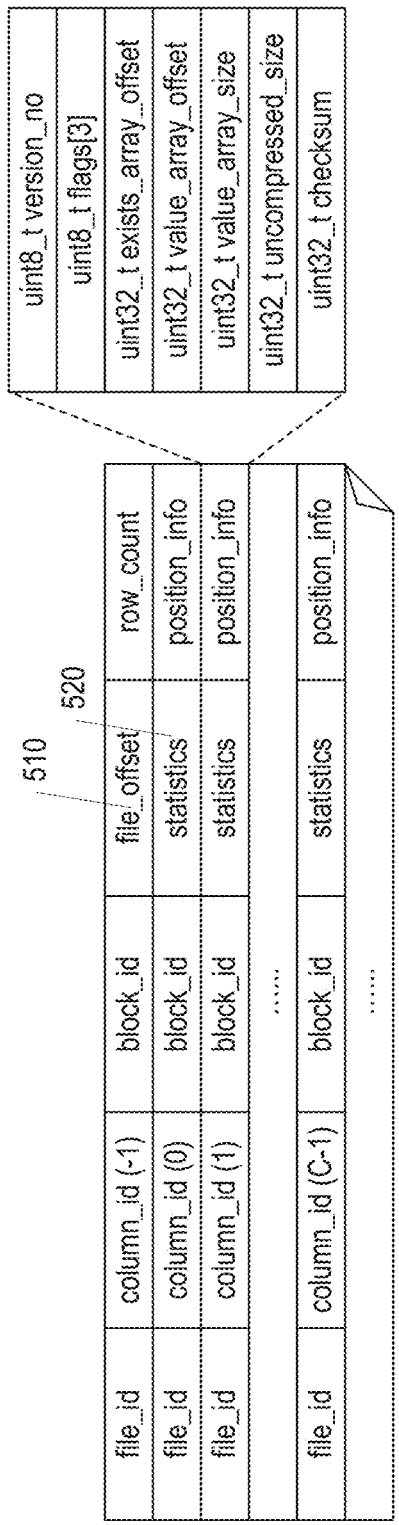
FIG. 5 illustrates a schematic diagram of an exemplary block description table, consistent with some embodiments of the present disclosure.

FIG. 5 illustrates a schematic diagram of an exemplary block description table, according to some embodiments of the present disclosure.

The block description table that describes schema of each column in the blocks of the file is provided. The block description table can include attributes such as location offsets (file_offset 510 shown in FIG. 5) of blocks in a file, a delete bitmap that indicates deleted rows in the block, and statistic information (statistics 520 shown in FIG. 5) including minimum value and maximum value of each column in the block. The statistic information of the blocks can be used to filter out the blocks before the blocks in the file are accessed. The database shown in FIG. 1 is used as an example, if a query is generated to analyze employees whose salaries are below 5000 while the minimum value of the "salary" column in block 0 is 10000, then further queries of data in block 0 can be eliminated to reduce I/O operation cost.

Table 1 below shows description of exemplary attributes contained in the block description table. For example, delete bitmap is used to support a delete operation, can indicate which rows of the relational table are to be deleted by marking the deleted rows with value −1. The values of each column in the file can be retrieved via offset information stored in position info of each column. Any row can be located in the file by an index (e.g., index[file number, row number]) along with seg_no, start_row_no and row_count.

Figure 6:
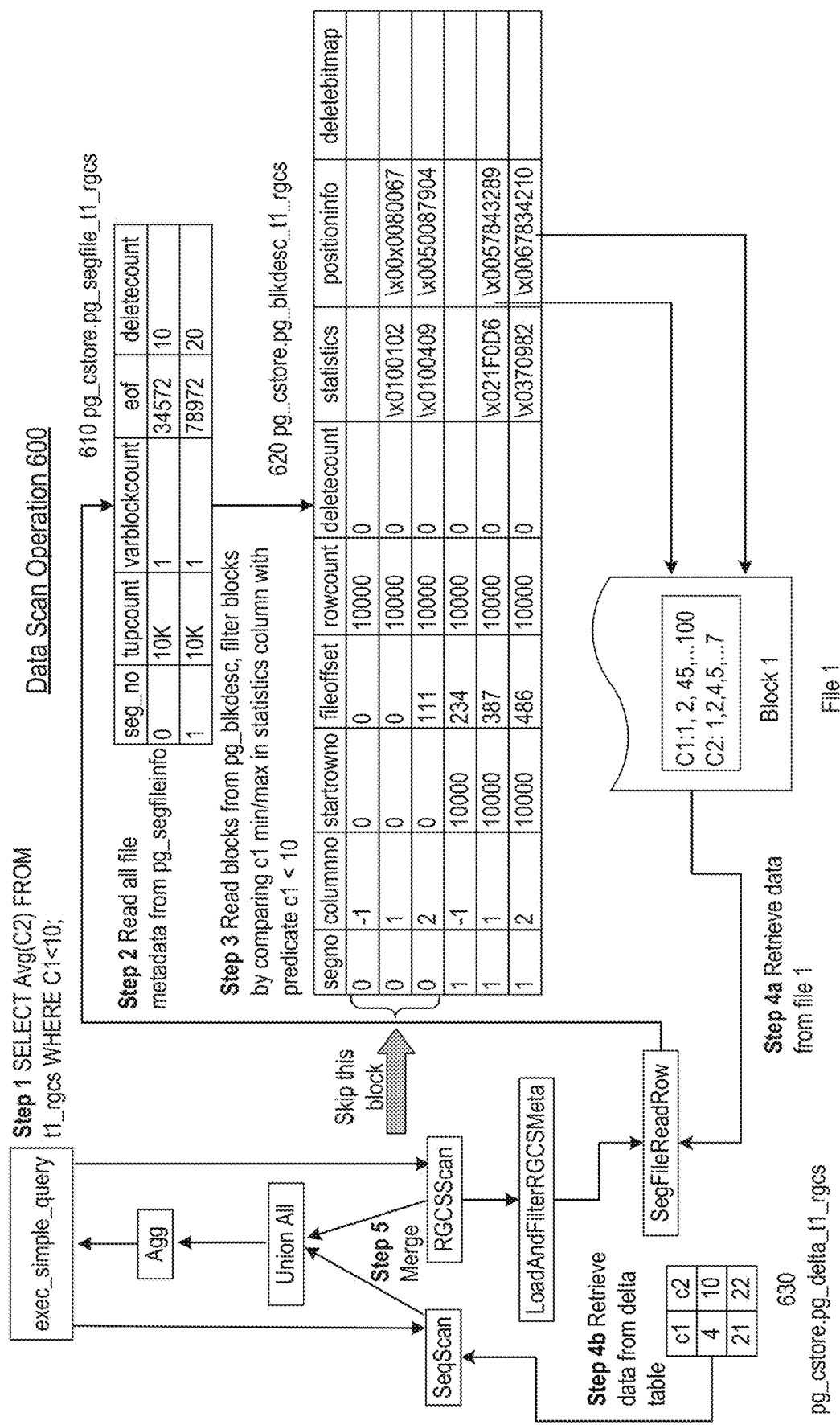
FIG. 6 illustrates an exemplary data scan operation, consistent with some embodiments of the present disclosure.

For example, as shown in FIG. 6, table pg_cstore.pg_blkdesc_tl_rgcs 620, when file number seg_no is 1, start_row_no for file 0 is 10000, row N with an index [1, N] can be located at address N+10000.

TABLE 1

Attribute Description of Block Description Table

| Attribute | Type | Description |
| --- | --- | --- |
| seg_no | INT4 | segment file number |
| column_no | INT4 | column number, same as pg_attribute_attnum (starting from 1), value −1 is used to mark the deleted rows in delete_bitmap |
| start_row_no | INT8 | initial row number of the block |
| file_offset | INT8 | only valid at column_no = −1 |
| row_count | INT4 | only valid when column_no = −1, number of rows in the block, including deleted rows |
| delete_count | INT4 | only valid when column_no = −1, number of deleted rows in the block |
| delete_bitmap | BYTEA | only valid when column_no = −1 |
| statistics | BYTEA | only valid when column_no > 0, statistics of a column |
| position_info | BYTEA | only valid when column_no > 0, position info of a column |

The file information table (not shown) that describes schema information of the file is provided. The file information table can include attributes such as file number (seg_no), total number of rows including deleted rows, total number of blocks and size of the file (eof). For example, attribute eof can help support multiple bulk load transactions. When multiple bulk load transactions are requested at the same time, different transactions are not allowed to write into the same file. Each transaction is assigned with a different file to write, or is assigned to a newly created one if there is no file available. The eof column not only indicates the size of the file, but also supports the ACID requirements of the transactions. When a bulk load transaction commits, the load transaction updates the eof column with a new offset such that the inserted data is visible. When a bulk load transaction aborts, the original eof still points to the offset before the load transaction happens. This can cause the inserted data to be unavailable even if the new data is already in the file.

The other exemplary attributes of the file information table are shown in Table 2 below. For example, as shown in FIG. 6, table pg_cstore.pg_segfile_tl_rgcs 610 contains columns seg_no, tupcount, varblockcount, eof and deletecount. An exemplary file 0 has one block (varblockcount=1), the block has 10000 rows (tupcount=10 k) with 10 deleted rows (deletecount=10).

TABLE 2

Attribute Description of File Information Table

| Attribute name | Type | Description |
| --- | --- | --- |
| seg_no | INT4 | file number |
| tup_count | INT8 | total number of rows in the file including deleted rows, also being used to generate row number for new rows. |
| varblock_count | INT8 | total number of blocks |
| eof | INT8 | total size of file |

If metadata is available in a database system, the database system can take advantage of the statistical information and location information of each column shown in the metadata table and further improve the efficiency of prefetching data for query execution.

A scan operation is a primitive operation in database queries. A scan operation takes as input a table, and optionally a set of projected columns and a set of predicates, and outputs a set of projected rows in a database table that satisfies the given predicates. In an example, a data scan process written in language PostgreSQL performs queries against a columnar-row table. FIG. 6 illustrates an exemplary data scan operation. In this example, queries against a columnar-row table is implemented in PostgreSQL, an open source database. It is appreciated that the exemplary data scan operation can be performed in PostgreSQL and various database systems including MySQL. The data scan operation can include the following steps.

In step 1, a query that has a predicate "C1<10" is initiated. The query is to return an average value of column C2 from the rows where the value in column C1 is less than 10. The "where" clause is used to filter elements in the database.

In step 2, file metadata information is retrieved from a file information table pg_segfileinfo. As shown in exemplary table 610 pg_cstore.pg_segfile_tl_rgcs, an exemplary file 0 has one block (varblockcount=1), the block has 10000 rows (tupcount=10 k) with 10 deleted rows (deletecount=10).

In step 3, block metadata information is retrieved from a block description table pg_blkdesc. Since the query contains the predicate, the predicate information is used to filter out blocks by comparing the predicate with statistic information (e.g., maximum/minimum of values) of the blocks. The predicate in this example is C1<10. The query looks for elements that are less than 10 in column C1. Instead of accessing each block, statistics information of each block can be used to avoid retrieving blocks that do not have any elements in column C1 being less than 10. By comparing the minimum values of C1 of the blocks with the value 10, blocks that do not satisfy this condition are filtered out and are not retrieved. In this example, suppose the file with file number 0 (seg_no=0) does not satisfy the predicate, the first three rows which belong to file 0 shown in FIG. 6 are filtered out.

In step 4a, position information in the block description table of the blocks that satisfies the predicate can be used to retrieve data from a file. Other metadata of file information table can also be used to assist retrieving the data. The database system can also evaluate a delete bitmap for each satisfied row for filtering deleted rows in a block. Then, the database system retrieves data from exemplary file 1. As shown in FIG. 6, file 1 has exemplary block 1 where values in column C2 are less than 10.

When insert or update operations are performed on the columnar-row table, new data caused by operations such as insert and delete is saved into a delta table temporarily. In step 4b, which can be performed independently from step 4a, the new data can be retrieved from the delta table 630 pg_cstore.pg_delta_tl_rgcs.

In step 5, in response to receiving the new data from the delta table, and the data retrieved from the exemplary file 1, the database system can perform Union All operation and Agg (aggregation) operation to merge the collected data for outputting the results of the query requested in step 1.

Figure 7:
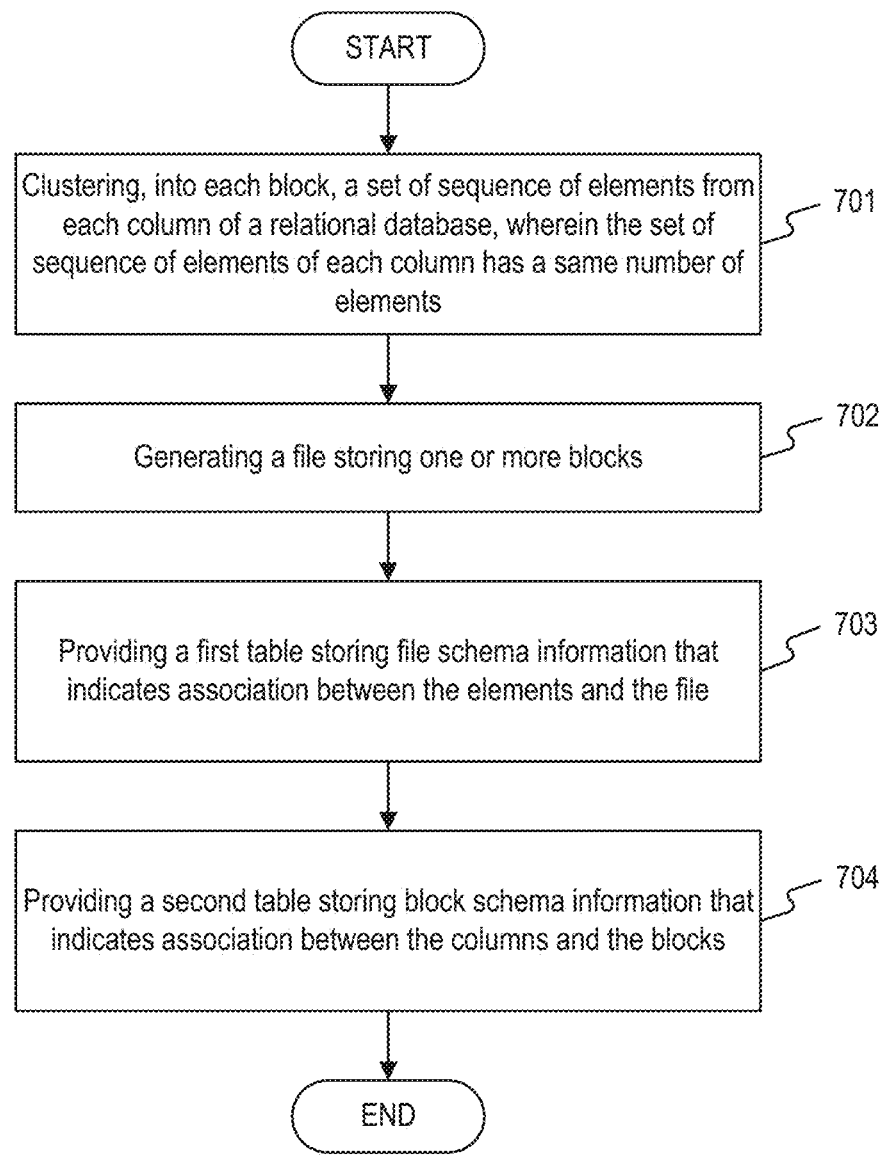
FIG. 7 illustrates a flowchart of an exemplary method for formatting a relational database, consistent with some embodiments of the present disclosure.

FIG. 7 illustrates a flowchart of an exemplary method for formatting a relational database, consistent with some embodiments of the present disclosure. In some embodiments, method 700 can be performed by a database system (e.g., database system 100 of FIG. 3) or a server (e.g., server 110 of FIG. 3). The method can include the following steps.

In step 701, a database system clusters, into each block, a set of sequence of elements from each column of a relational database. Within one block, the number of the elements of multiple columns is the same. For example, in column 1, the $1^{st}$ element to the $9999^{th}$ element are clustered, in column 2, the $1^{st}$ element to the $9999^{th}$ element are clustered, and the same range of elements are also clustered for the rest of the columns of the relational database. The clustered sequence of elements of multiple columns are contained in the block (e.g., block 1 of FIG. 4).

In step 702, the database system generates a file storing one or more blocks having the clustered set of sequences of elements. The blocks of variable sizes are saved in the file. A second block can contain a same or a different length of sequence of elements clustered from multiple columns. For example, while block 1 contains the $1^{st}$ element to the $9999^{th}$ element. Block 2 can contain the $10000^{th}$ element to the $19999^{th}$ element, or the $10000^{th}$ element to the $29999^{th}$ element. The size of the blocks can vary. The relational database is formatted to a table that combines a column storage format and a row storage format.

In step 703, the database system provides a first table storing file schema information that associates the elements with the file. In some embodiments, the file schema information includes at least one of a total number of rows in the file, a total number of blocks, or a total size of the file. For example, as shown in FIG. 6, the file schema information can be retrieved from table 610 pg_cstore.pg_segfile_tl_rgcs in step 2. In file 0 (seg_no=0), tupcount indicates that there are 10000 rows in the file, varblockcount indicates that there is one block in the file, and eof indicates a total size of file 0.

In step 704, the database system provides a second table for storing block schema information that associates the columns with the one or more blocks. As shown in FIG. 6, the block schema information can be retrieved from table 620 pg_cstore.pg_blkdesc_tl_rgcs in step 3. Step 703 and step 704 can be performed concurrently or sequentially in any order, and can be performed independently.

Figure 8:
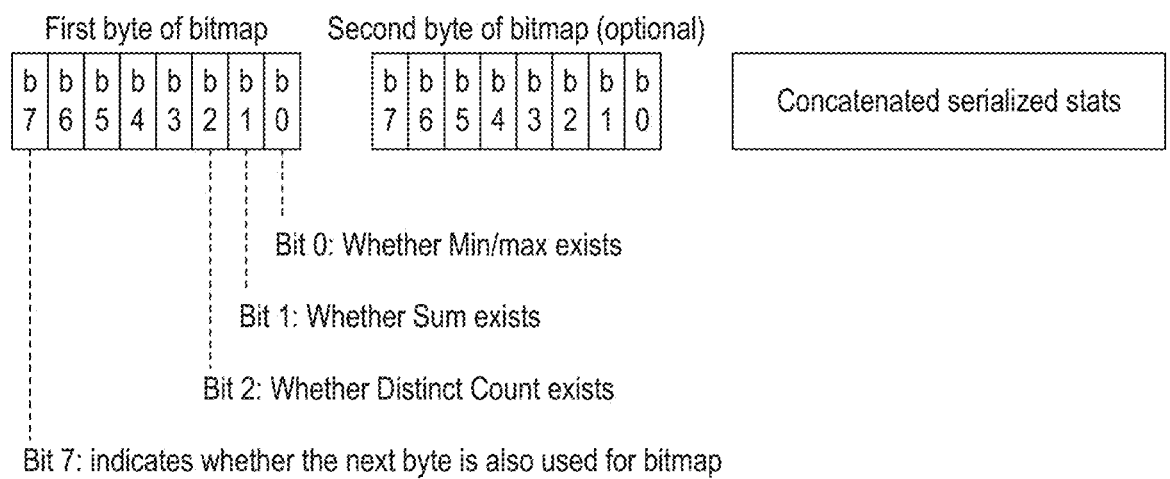
FIG. 8 illustrates a schematic diagram of an exemplary statistic bitmap, consistent with some embodiments of the present disclosure.

In some embodiments, the block schema information can include at least one of a starting row of each block in the file (e.g., startrowno in FIG. 6, which is 0 for file 0 and 10000 for file 1), a total number of rows in each block (e.g., rowcount in FIG. 6, which is 10000 for both file 0 and file 1), a total number of deleted rows in each block (e.g., deletecount in FIG. 6), a delete bitmap, statistics of a column, or position information of a column (e.g., fileoffset in FIG. 6). The statistics in the block description table is stored as bytea type. A minimum value and a maximum value of a column can be included in the statistics. In some embodiments, a statistics bitmap can be used to indicate statistics information (e.g., statistics column in FIG. 6). FIG. 8 illustrates a schematic diagram of an exemplary statistic bitmap, consistent with some embodiments of the present disclosure.

The statistics bitmap can have a variable number of bytes. Each byte has a lowest 7 bits, each bit can indicate whether specific statistical information exists (1) or not (0). The highest bit (e.g., bit 7 in FIG. 8) indicates whether the next byte is also used for bitmap (1 for yes, and 0 for no). Bit 0 can indicate whether there is a minimum value or a maximum value of a block is included in the statistics bitmap. Bit 1 can indicate whether there is a sum value of a block. A second byte is optional for the bitmap.

In some embodiments, the block schema information also includes the delete bitmap. The delete bitmap can indicate deleted rows of the relational database. In the delete bitmap (e.g., deletebitmap column in table 620 pg_cstore.pg_blkdesc_tl_rgcs in FIG. 6), the deleted rows can be marked with a value 0 while undeleted rows can be marked with a value 1 for distinguishing. The total number of deleted rows can be included in the block description table.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. It is understood that multiple ones of the above described modules/units may be combined as one module/unit, and each of the above described modules/units may be further divided into a plurality of sub-modules/sub-units.

Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

The embodiments may further be described using the following clauses:

1. A method for formatting a database, comprising:
    clustering, into each block, a set of sequence of elements from each column of the database;
    generating a file storing one or more blocks having the clustered set of sequences of elements;
    providing a first table storing file schema information that associates the elements with the file; and
    providing a second table for storing block schema information that associates the columns with the one or more blocks.
2. The method of clause 1, wherein the file schema information includes at least one of a total number of rows in the file, a total number of blocks, or a total size of the file.
3. The method of clause 1, wherein the block schema information includes at least one of a starting row of each block in the file, a total number of rows in each block, a total number of deleted rows in each block, a delete bitmap, statistics of a column, or position information of a column.
4. The method of clause 3, wherein the delete bitmap indicates deleted rows of the database.
5. The method of clause 3, wherein a block of the one or more blocks is filtered out in data retrieval in response to a determination that the block does not contain elements that satisfy a predicate of a query based on comparison between the statistics of the block and the predicate.
6. The method of clause 3, wherein the statistics of a column includes at least one of a maximum value of elements in a column, or a minimum value of elements in a column.
7. The method of any one of clauses 1-6, further comprising:
    providing a third table storing changes of the elements, the changes being caused by a data operation.
8. A method for performing a data operation in a database, comprising:

receiving a query on the database, the database including a file storing one or more blocks, each block having a set of sequence of elements clustered from each column of the database;

retrieving, from a file information table, file schema information that associates the elements with the file;

retrieving, from a block description table, block schema information that associates the columns with the one or more blocks; and retrieving, from a set of the one or more blocks, a first set of elements based on the file schema information and the block schema information.

9. The method of clause 8, wherein the set of the one or more blocks satisfies a predicate of the query based on comparison between the block schema information and the predicate.

10. The method of clause 8, wherein the file schema information includes at least one of a total number of rows in the file, a total number of blocks, or a total size of the file.

11. The method of clause 8, wherein the block schema information includes at least one of a starting row of each block in the file, a total number of rows in each block, a total number of deleted rows in each block, a delete bitmap, statistics of a column, or position information of a column.

12. The method of clause 11, wherein the delete bitmap indicates deleted rows of the database.

13. The method of clause 11, wherein the statistics of a column include at least one of a maximum value of elements in a column, or a minimum value of elements in a column.

14. The method of any one of clauses 8-13, further comprising:

retrieving, from a third table, changes of the elements, the changes being caused by a data transaction.

15. A database system for formatting a database, comprising:

a memory storing a set of instructions; and a processor configured to execute the set of instructions to cause the database system to:

cluster, into each block, a set of sequence of elements from each column of a relational database, wherein the set of sequence of elements of each column has a same number of elements, generate a file storing one or more blocks having the clustered set of sequences of elements, provide a first table storing file schema information that associates the elements with the file, and provide a second table for storing block schema information that associates the columns with the one or more blocks.

16. The database system of clause 15, wherein the file schema information includes at least one of a total number of rows in the file, a total number of blocks, or a total size of the file.

17. The database system of clause 15, wherein the block schema information includes at least one of a starting row of each block in the file, a total number of rows in each block, a total number of deleted rows in each block, a delete bitmap, statistics of a column, or position information of a column.

18. The database system of clause 17, wherein the delete bitmap indicates deleted rows of the database.

19. The database system of clause 17, wherein a block of the one or more blocks is filtered out in data retrieval in response to a determination that the block does not contain elements that satisfy a predicate of a query based on comparison between the statistics of the block and the predicate.

20. The database system of clause 17, wherein the statistics of a column include at least one of a maximum value of elements in a column, or a minimum value of elements in a column.

21. The database system of any one of clauses 15-20, wherein the processor is further configured to cause the database system to:

provide a third table storing changes of the elements, the changes being caused by a data operation.

22. A non-transitory computer readable medium that stores a set of instructions that is executable by at least one processor of a computer to cause the computer to perform a method for formatting a relational database, the method comprising:

clustering, into each block, a set of sequence of elements from each column of a relational database, wherein the set of sequence of elements of each column has a same number of elements;

generating a file storing one or more blocks having the clustered set of sequences of elements;

providing a first table storing file schema information that associates the elements with the file; and providing a second table for storing block schema information that associates the columns with the one or more blocks.

23. The computer readable medium of clause 22, wherein the file schema information includes at least one of a total number of rows in the file, a total number of blocks, or a total size of the file.

24. The computer readable medium of clause 22, wherein the block schema information includes at least one of a starting row of each block in the file, a total number of rows in each block, a total number of deleted rows in each block, a delete bitmap, statistics of a column, or position information of a column.

25. The computer readable medium of clause 24, wherein the delete bitmap indicates deleted rows of the database.

26. The computer readable medium of clause 24, wherein a block of the one or more blocks is filtered out in data retrieval in response to a determination that the block does not contain elements that satisfy a predicate of a query based on comparison between the statistics of the block and the predicate.

27. The computer readable medium of clause 24, wherein the statistics of a column include at least one of a maximum value of elements in a column, or a minimum value of elements in a column.

28. The computer readable medium of any one of clauses 22-27, wherein the set of instructions that is executable by one or more processors of the computer to cause the computer to further perform:

provide a third table storing changes of the elements, the changes being caused by a data operation.

29. A dimensional database data structure stored in one or more computer memories, the data structure comprising:

a fact table including a file storing one or more blocks, each block having a set of sequence of elements clustered from each column of the database;

a first dimension table containing file schema information that associates the elements with the file; and a second dimension table containing block schema information that associates the columns with the one or more blocks.
30. The data structure of clause 29, wherein the file schema information includes at least one of a total number of rows in the file, a total number of blocks, or a total size of the file.
31. The data structure of clause 29, wherein the block schema information includes at least one of a starting row of each block in the file, a total number of rows in each block, a total number of deleted rows in each block, a delete bitmap, statistics of a column, or position information of a column.
32. The data structure of clause 31, wherein the delete bitmap indicates deleted rows of the database.
33. The data structure of clause 31, wherein a block of the one or more blocks is filtered out in data retrieval in response to a determination that the block does not contain elements that satisfy a predicate of a query based on comparison between the statistics of the block and the predicate.
34. The data structure of any one of clauses 29-31, further comprising:
a third dimension table containing changes of the elements, the changes being caused by a data operation.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method for formatting a database, comprising:
clustering, into each block of a set of blocks representing the database, a set of sequence of elements from each column of the database, wherein each block of the set of blocks corresponds to a different set of rows from the database, and the clustered set of sequence of elements is stored in a columnar format in each block of the set of blocks;
generating a file storing one or more blocks having the clustered set of sequences of elements;
providing a first table storing file schema information that associates the elements with the file; and
providing a second table for storing block schema information that associates the columns with the one or more blocks.
2. The method of claim 1, wherein the file schema information includes at least one of a total number of rows in the file, a total number of blocks, or a total size of the file.
3. The method of claim 1, wherein the block schema information includes at least one of a starting row of each block in the file, a total number of rows in each block, a total number of deleted rows in each block, a delete bitmap, statistics of a column, or position information of a column.
4. The method of claim 3, wherein the delete bitmap indicates deleted rows of the database.
5. The method of claim 3, wherein a block of the one or more blocks is filtered out in data retrieval in response to a determination that the block does not contain elements that satisfy a predicate of a query based on comparison between the statistics of the block and the predicate.
6. The method of claim 3, wherein the statistics of a column includes at least one of a maximum value of elements in a column, or a minimum value of elements in a column.
7. The method of claim 1, further comprising:
providing a third table storing changes of the elements, the changes being caused by a data operation.
8. The method of claim 1, wherein the first table and the second table support Atomicity, Consistency, Isolation, and Durability (ACID).
9. A database system for formatting a database, comprising:
a memory storing a set of instructions; and
a processor configured to execute the set of instructions to cause the database system to:
cluster, into each block of a set of blocks representing the database, a set of sequence of elements from each column of a relational database, wherein each block of the set of blocks corresponds to a different set of rows from the database and the set of sequence of elements of each column has a same number of elements, and the clustered set of sequence of elements is stored in a columnar format in each block of the set of blocks;
generate a file storing one or more blocks having the clustered set of sequences of elements;
provide a first table storing file schema information that associates the elements with the file; and
provide a second table for storing block schema information that associates the columns with the one or more blocks.
10. The database system of claim 9, wherein the file schema information includes at least one of a total number of rows in the file, a total number of blocks, or a total size of the file.
11. The database system of claim 9, wherein the block schema information includes at least one of a starting row of each block in the file, a total number of rows in each block, a total number of deleted rows in each block, a delete bitmap, statistics of a column, or position information of a column.
12. The database system of claim 11, wherein the delete bitmap indicates deleted rows of the database.
13. The database system of claim 11, wherein a block of the one or more blocks is filtered out in data retrieval in response to a determination that the block does not contain elements that satisfy a predicate of a query based on comparison between the statistics of the block and the predicate.
14. The database system of claim 11, wherein the statistics of a column include at least one of a maximum value of elements in a column, or a minimum value of elements in a column.
15. The database system of claim 9, wherein the processor is further configured to cause the database system to:
provide a third table storing changes of the elements, the changes being caused by a data operation.

16. A non-transitory computer readable medium that stores a set of instructions that is executable by at least one processor of a computer to cause the computer to perform a method for formatting a relational database, the method comprising:

clustering, into each block of a set of blocks representing the database, a set of sequence of elements from each column of a relational database, wherein each block of the set of blocks corresponds to a different set of rows from the database and the set of sequence of elements of each column has a same number of elements, and the clustered set of sequence of elements is stored in a columnar format in each block of the set of blocks;

generating a file storing one or more blocks having the clustered set of sequences of elements;

providing a first table storing file schema information that associates the elements with the file; and providing a second table for storing block schema information that associates the columns with the one or more blocks.

17. The computer readable medium of claim 16, wherein the file schema information includes at least one of a total number of rows in the file, a total number of blocks, or a total size of the file.

18. The computer readable medium of claim 16, wherein the block schema information includes at least one of a starting row of each block in the file, a total number of rows in each block, a total number of deleted rows in each block, a delete bitmap, statistics of a column, or position information of a column.

19. The computer readable medium of claim 18, wherein the delete bitmap indicates deleted rows of the database.

20. The computer readable medium of claim 18, wherein a block of the one or more blocks is filtered out in data retrieval in response to a determination that the block does not contain elements that satisfy a predicate of a query based on comparison between the statistics of the block and the predicate.

21. The computer readable medium of claim 16, wherein the set of instructions that is executable by one or more processors of the computer to cause the computer to further perform:

provide a third table storing changes of the elements, the changes being caused by a data operation.

* * * * *